Dec. 20, 1960
C. T. HEWSON ET AL
2,964,905
AIRCRAFT CONTROL MEANS
Filed Jan. 20, 1958
3 Sheets-Sheet 1
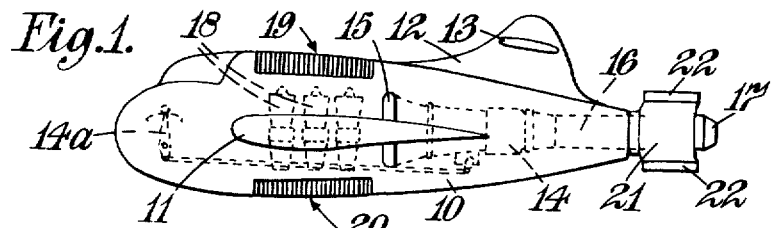
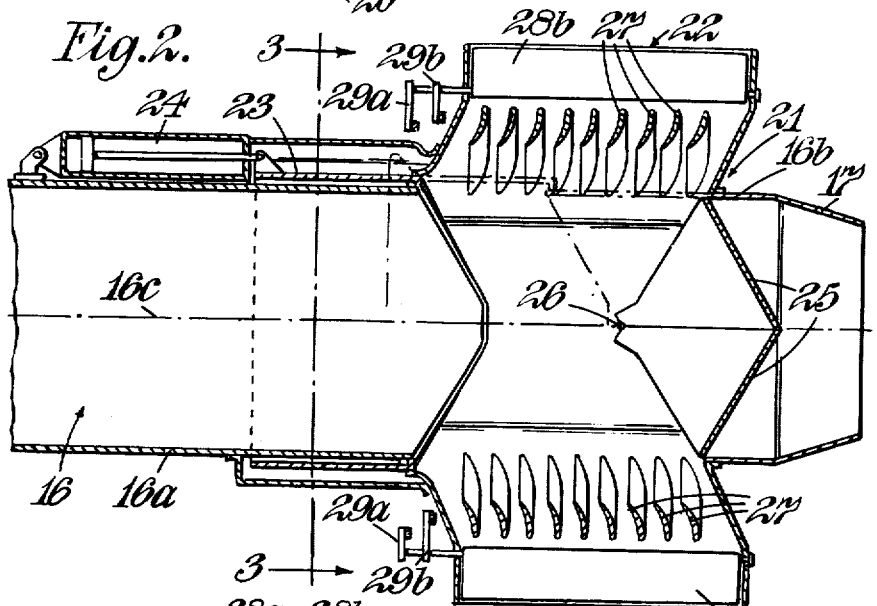
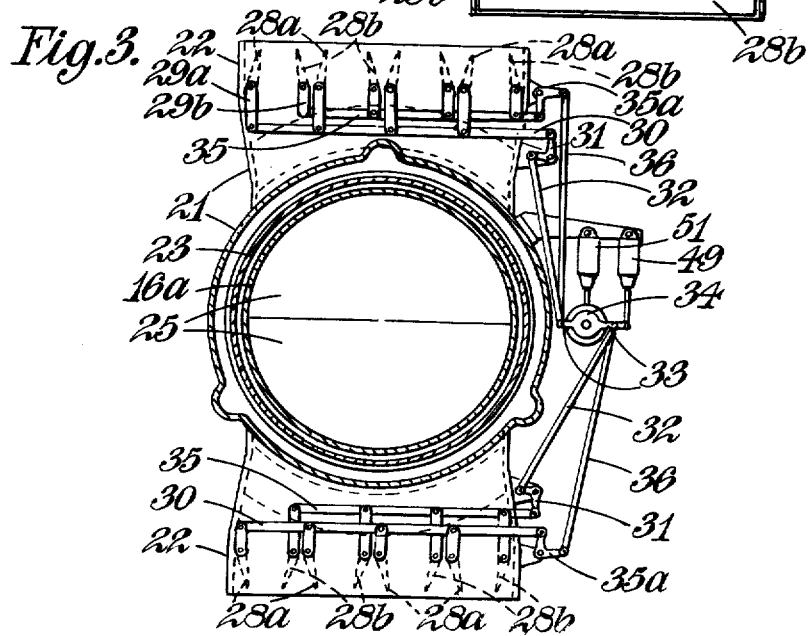

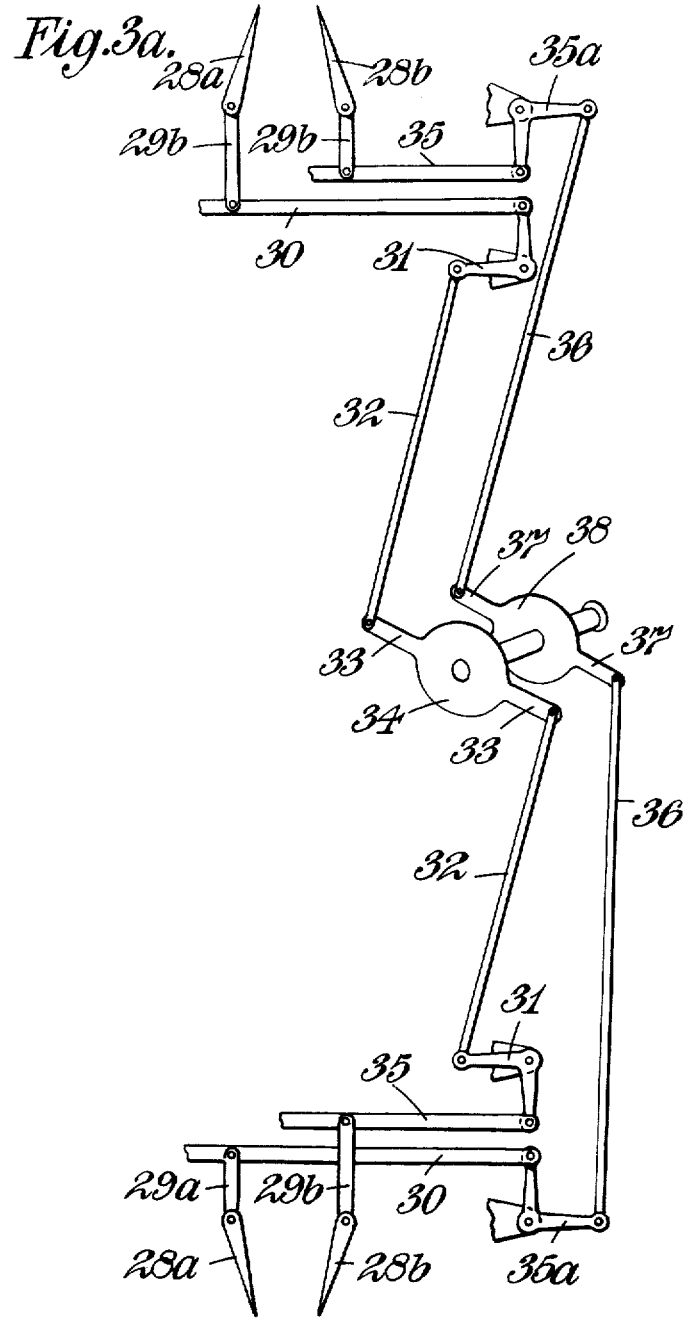

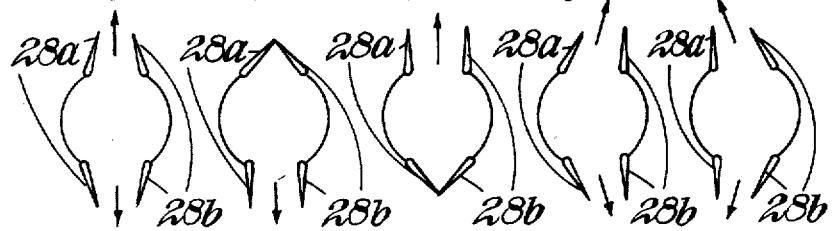
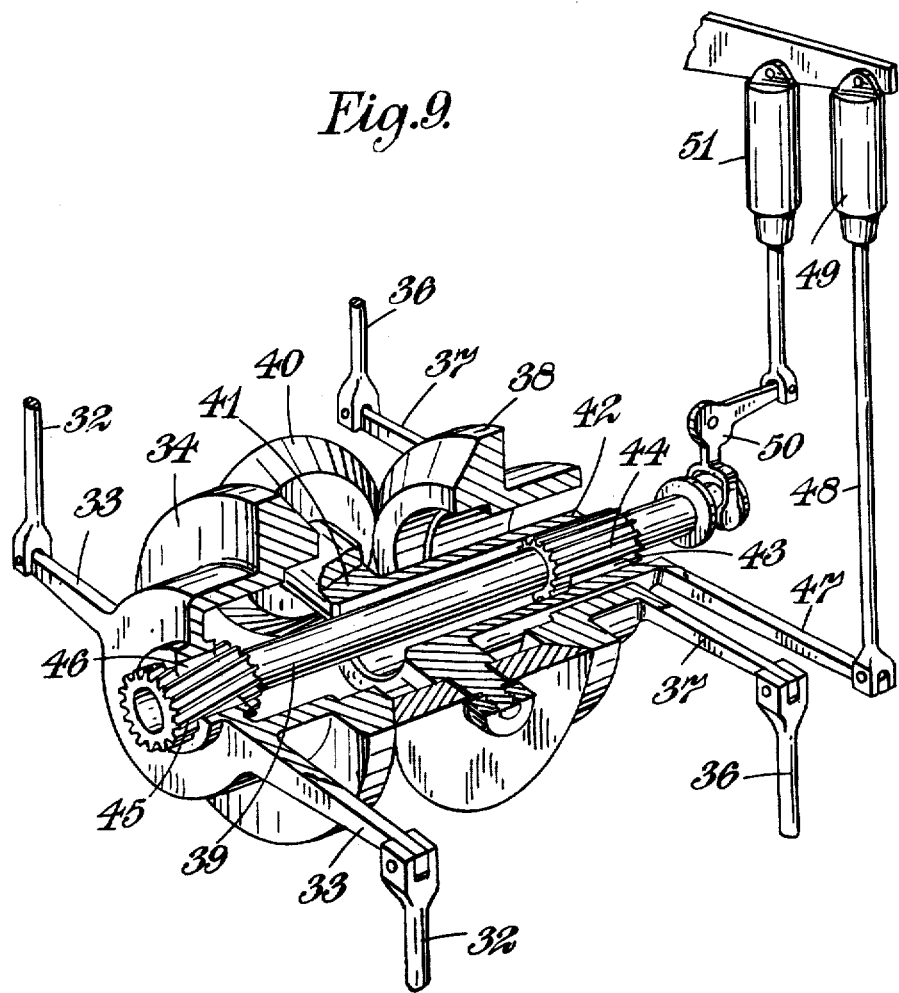

United States Patent Office 2,964,905
Patented Dec. 20, 1960

2,964,905
AIRCRAFT CONTROL MEANS

Colin Taylor Hewson, Duffield, and Peter Arthur Ward, Littleover, England, assignors to Rolls-Royce Limited, Derby, England, a company of Great Britain Filed Jan. 20, 1958, Ser. No. 710,060

Claims priority, application Great Britain Jan. 25, 1957

6 Claims. (Cl. 60—35.54)

This invention comprises improvements in or relating to control means for aircraft, more particularly aircraft powered by a jet propulsion engine or engines, and has for an object to provide improved means for controlling the flight attitude of such an aircraft.

According to the present invention, an aircraft comprises a jet pipe having at its outlet a nozzle through which gases flow to atmosphere as a propulsive jet, and also having at a position upstream of the nozzle a pair of oppositely-facing auxiliary outlets through which gases pass to atmosphere in a direction transverse to the jet-pipe axis, means to control the delivery of the gases to the nozzle and the auxiliary outlets, deflector flap means associated with each of the auxiliary outlets, and a control mechanism for the deflector flap means whereby the effective area of one auxiliary outlet may be increased as the other is decreased so as to produce a turning movement on the aircraft about one axis of freedom and whereby alternatively the gases issuing from the auxiliary outlets are deflected in the same sense relative to the aircraft to produce thereon a turning moment about a second axis of freedom which is at right angles to the first axis.

The invention has particular advantage in connection with the control of lift aircraft, that is aircraft provided with power plant for producing lift other than lift produced by the flow of air over aerofoil surfaces in forward flight. In such an aircraft, the jet pipe provided with the auxiliary outlets may be that employed for conveying propulsive gases to a rearwardly-facing nozzle for producing a propulsive effect in normal forward flight, and the auxiliary outlets may be employed for controlling the attitude of the aircraft when the lift power plant is operative. In this case, the means controlling the delivery of gases to the nozzle and auxiliary outlets is conveniently arranged to cut off the supply to the nozzle when the auxiliary outlets are opened and to cut off the supply to the auxiliary outlets when the nozzle is being supplied with gases in normal forward flight.

According to a preferred arrangement in such a lift aircraft, the gas delivery control means comprises adjustable flap elements having an operative position in which they cut off the gas flow to the nozzle and an inoperative position in which they permit gas to flow to the nozzle, and a sleeve valve around the jet pipe, the sleeve valve having an operative position in which it co-operates with the flap elements when they are inoperative to cover the auxiliary outlets, and an inoperative position in which the auxiliary outlets are uncovered.

According to another preferred feature of the invention, the deflector flap means associated with the auxiliary outlets comprise at least one pair of flaps in each auxiliary outlet, the flaps being pivoted to swing about parallel axes, for instance axes parallel to the jet pipe axis, and the control mechanism for the flaps is adapted selectively to adjust each pair of flaps angularly towards or away from one another to equal extents, or angularly in the same sense to equal extents, and to correlate the angular adjustments of the flaps of the two auxiliary outlets to obtain the desired turning moments.

In one preferred arrangement, considering such pair of flaps to have a right-hand flap and a left-hand flap, each auxiliary outlet has a plurality of pairs of such flaps, the right-hand flaps associated with an auxiliary outlet are linked together to move angularly in the same sense as one another i.e. clockwise or anti-clockwise, and the left-hand flaps associated with an auxiliary outlet are linked together to move in the same sense as one another, and the right-hand flaps of each outlet are linked with the left-hand flaps of the other outlet so that when the right-hand flaps move clockwise the left-hand flaps move anti-clockwise. The two linked sets of flaps thus formed, each comprising right-hand flaps of one outlet and the left-hand flaps of the other outlet, are coupled for actuation to respective sunwheels of a differential gear which may be driven either so that the sun gears rotate in opposite directions, or so that the gear rotates solidly and the sun gears rotate in the same direction.

One construction of this invention will now be described with reference to the accompanying drawings, in which:

Figure 1 shows in side elevation an aircraft fitted with control means of the invention, Figure 2 is an axial section through the control means, Figure 3 is a section on the line 3—3 of Figure 2, Figure 3a is a diagrammatic illustration of the linkage for the control means, Figures 4, 5, 6, 7, 8 are diagrammatic illustrations of various settings of the control means, and Figure 9 is a perspective view with parts broken away showing in detail mechanism for the control means.

Referring first to Figure 1, the aircraft shown is a lift aircraft and comprises a fuselage 10 with wings 11, tail fin 12 and tail plane 13. For normal flight, the aircraft has a main gas-turbine engine 14 accommodated within the fuselage 10 and the engine takes in air through intakes 15 in the fuselage and delivers exhaust gases into a jet pipe 16 terminating in a rearwardly-facing propulsion nozzle 17. In normal flight, lift is generated on the aircraft aerodynamically by passage of air over the wings 11 and any other aerofoil surface.

The aircraft is also provided with power plant for generating lift on the aircraft other than lift generated aerodynamically in forward flight comprising a plurality of scaled-down gas-turbine engines 18 arranged within the fuselage with their axes vertical. The engines 18 take in air through an intake 19 in the upper surface of the fuselage and deliver their exhaust gases downwardly through an outlet 20 in the underside of the fuselage. The engines 18 may be fixed in the position shown, or may be arranged to swing about a horizontal axis transverse to the longitudinal centre line of the aircraft so as to produce a propulsive thrust component as well as lift under some operating conditions.

It will be clear that under low speed forward flight conditions, control of the aircraft by normal control means, such as ailerons, is difficult and accordingly the following arrangement may be adopted to improve attitude control of the aircraft.

Referring to Figures 2 and 3, the jet pipe 16 is divided to provide an upstream portion 16a extending from the engine 14 and a downstream portion 16b carrying the nozzle 17, the portion 16b being axially spaced from the portion 16a, and a structure 21 is provided enclosing and joining the adjacent ends of two portions 16a, 16b.

The structure 21 affords a pair of square auxiliary outlets 22 which may be fed with exhaust gases from the jet pipe, one of which outlets 22 faces upwardly and the other downwardly (as will be seen from Figure 1). The structure 21 also houses a sleeve valve 23 surrounding the jet pipe and a ram 24 by which the sleeve valve 23 can be moved rearwardly partly to close the gap between the jet pipe portions 16a, 16b and forwardly to an inoperative position as shown. The structure 21 also houses a pair of flap valve elements 25 which swing on pivots 26 about an axis transverse to the jet pipe axis 16c between the position shown in which they prevent exhaust gases from reaching the nozzle 17 and a position (shown in chain lines) in which they co-operate with the sleeve valve 23 to provide a section of the jet pipe joining the portions 16a, 16b thereby cutting off the outlets 22 from the jet pipe and allowing exhaust gases from engine 14 to flow to the nozzle 17 to be delivered rearwards in the form of a propulsive jet. The structure 21 also has fitted in it vanes 27 for assisting in directing exhaust gases towards the outlets 22 when the sleeve valve 23 and flap elements 25 are in their full line positions.

In order to control the resultant turning moment produced on the aircraft by the exhaust gases issuing from the outlets 22, each outlet 22 has fitted in it a plurality of pairs of flaps 28a, 28b which swing about axes parallel to the jet pipe axis 16c. For convenience the flaps 28a will be referred to as left-hand flaps and the flaps 28b will be referred to as right-hand flaps. Each pair of flaps 28a, 28b defines a slot-like opening, the area of which can be varied by adjusting the flaps angularly towards and away from one another, or of which the line of action of the issuing gases can be varied by moving the flaps in the same sense.

Referring to Figures 3 to 9, the flaps 28a, 28b have each an operating arm 29a, 29b respectively. The operating arms 29a of the flaps 28a associated with each outlet 22 are connected together for like operation by a bar 30, and the operating arms 29b are connected together for like operation by corresponding bars 35. The bar 30 of the upper outlet 22 is connected via bellcrank 31 and link rod 32 to one of a pair of radial arms 33 on a sun gear 34 of a differential mechanism (Figure 9) and the other radial arm 33 is connected by a like linkage comprising a rod 32 and bellcrank 31, to the bar 35 of the lower outlet 22. The linkage is arranged so that when the flaps 28a of the upper outlet turn clockwise, the flaps 28b of the lower outlet turn anti-clockwise, and vice versa. The bar 30 of the lower outlet 22 is connected to a bellcrank 35a and link rod 36 to one of a pair of oppositely-extending radial arms 37 on a second sun gear 38 of the differential mechanism and the other arm 37 is connected through a like linkage, comprising rod 36 and bellcrank 35a, to the bar 35 of the upper outlet. The linkage is such that when the flaps 28a of the lower outlet turn clockwise, the flaps 28b of the upper outlet turn anti-clockwise, and vice versa.

The sun gears 34, 38 mesh with planet gears 40 on a planet carrier 41 which has a hollow hub 42 formed with internal straight splines 43. These splines 43 are engaged by corresponding splines 44 on a spindle 39 which also has a set of helical splines 45 engaging internal helical splines 46 in the hub of sun gear 34. The sun gear 38 is free on the hub 42 of the planet carrier 41.

The spindle 39 is arranged for movement axially of itself by means of a fork 50 engaging the spindle, the fork 50 being rocked by a ram 51. On such axial movement of the spindle, the sun gear 34 is rotated due to the co-operating helical splines 45, 46 whilst the planet carrier 41 is not rotated so that the sun gear 38 is rotated in a direction opposite to the sun gear 34 through the planet gears 40. On movement of the spindle 39 in one axial direction, the flaps 28a, 28b will be moved from the position shown diagrammatically in Figure 4 in which the areas of outlet 22 are equal towards the position indicated in Figure 5 in which the upper outlet 22 is closed and the lower outlet 22 is fully open, and on axial movement of the spindle 39 in the opposite direction the flaps 28a, 28b are moved towards the positions of Figure 6 in which the upper outlet 22 is fully open and the lower outlet 22 is fully closed. With the areas of the outlets unequal a turning moment is produced on the aircraft about one axis of its freedom, which (with the outlets arranged as shown in Figures 1 and 2) gives a control of the aircraft in pitch.

The hub 42 of the planet carrier 41 has a radius arm 47 connected by a link 48 to an operating ram 49, and it will be seen that on telescoping of the ram 49, the planet carrier 41 will be rotated and that the epicyclic gear will rotate solidly, the sun gears 34, 38 thus rotating in the same sense and to equal angular extents. With the linkages as shown in Figures 3, 3a and 9, such solid rotation of the sun gears 34, 38 causes swinging of all the flaps 28a, 28b of one outlet 22 in the same sense, say clockwise, and all the flaps 28a, 28b of the other outlet in the opposite sense, as shown in Figures 7 and 8. Thus the streams of gas issuing from the two outlets are deflected in the same sense relative to the aircraft so producing a turning moment on the aircraft about an axis of freedom at right angles to the axis of turning produced with the flaps adjusted as in Figures 5 and 6, thereby to control its attitude about this axis of freedom. With the outlets and flaps arranged as above described, the turning moment produced with the flaps adjusted as in Figures 7 and 8 controls the aircraft in yaw.

By simultaneous operation of the rams 51, 49 a control both in pitch and yaw can be obtained.

In operation of the control means, the throttle lever 14a of main propulsion engine 14 will be set in the low speed range of its movement.

The area of each outlet 22 is preferably such as to be capable of handling the whole of the exhaust gas flow from the main engine 14 without unduly restricting the outflow of exhaust gas and without undesirably decreasing the pressure ratio across the turbine when one of the outlets 22 is fully closed as shown in Figures 5 and 6.

We claim:

1. An aircraft comprising a jet pipe having at its outlet a nozzle through which gases flow to atmosphere as a propulsive jet, and also having at a position upstream of the nozzle a pair of oppositely-facing auxiliary outlets through which gases pass to atmosphere in a direction transverse to the jet-pipe axis, means to control the delivery of the gases to the nozzle and the auxiliary outlets, a plurality of pairs of flaps pivotally mounted in each of the auxiliary outlets to swing angularly about parallel axes, each pair of flaps comprising a right-hand flap and a left-hand flap, the right-hand flaps associated with an auxiliary outlet being linked together to swing angularly in the same sense as one another and the left-hand flaps associated with an auxiliary outlet being linked together to swing angularly in the same sense as one another, the right-hand flaps of each outlet being linked with the left-hand flaps of the other auxiliary outlet so that when the right-hand flaps move clockwise the left-hand flaps move anti-clockwise to an equal angular extent and a control mechanism operable selectively to adjust either all the flaps of one auxiliary outlet in the same angular sense of movement and all the flaps of the other auxiliary outlet in the opposite angular sense, or all the right-hand flaps in one angular sense and all the left-hand flaps in the opposite angular sense.

2. An aircraft according to claim 1, wherein the flaps are pivoted to swing about axes parallel to the jet pipe axis.

3. An aircraft according to claim 1, wherein the control mechanism comprises a differential gear having a pair of sun gears, one sun gear being connected to adjust the right hand flaps of one auxiliary outlet and the left-hand flaps of the other auxiliary outlet and the second sun gear being connected to adjust the left-hand flaps of said one auxiliary outlet and the right-hand flaps of said other auxiliary outlet, said sun gears being rotatable selectively in the same sense or in opposite sense.

4. An aircraft according to claim 3, wherein the sun gears mesh with planet gears carried in a planet carrier which is rotatable coaxially with the sun gears, and the control mechanism comprises first motor means connected to rotate the planet carrier and the sun gears as a unit and second motor means connected to the planet carrier and one of the sun gears to rotate them relatively to one another.

5. An aircraft according to claim 4, wherein the planet carrier and the sun gears are hollow and a spindle extends through them, the spindle having a set of straight splines engaging the planet carrier and a set of helical splines engaging one of the sun gears whereby on longitudinal displacement of the spindle the sun gear and planet carrier rotate relatively, the second motor means being connected to move the spindle longitudinally and the first motor means being directly connected to rotate the planet carrier.

6. An aircraft comprising a jet pipe, a propulsion nozzle at the downstream end of the jet pipe, said jet pipe having at a position upstream of the propulsion nozzle a pair of oppositely-facing auxiliary outlets through which gases pass to atmosphere in a direction transverse to the nozzle axis, control means having a first setting in which the auxiliary outlets are closed and the gases flowing in the jet pipe flow to atmosphere through the propulsion nozzle and a second setting in which the auxiliary outlets are open and flow of gas to the propulsion nozzle is prevented, deflector flaps positioned in each of the auxiliary outlets and adjustable to vary the outlet areas of the auxiliary outlets and alternatively to vary the direction in which gas issues from the outlets, and a control mechanism coupling together the deflector flaps in the pair of auxiliary outlets and operable to adjust the deflector flaps simultaneously in the sense to reduce the area of one auxiliary outlet and simultaneously to increase the area of the other auxiliary outlet and alternatively to adjust the deflector flaps in the same sense relative to the aircraft and thereby to cause the gases issuing from the auxiliary outlets to be deflected in the same sense relative to the aircraft.

References Cited in the file of this patent
UNITED STATES PATENTS

| | | |
|---|---|---|
| 1,714,917 | Martin | May 28, 1929 |
| 2,280,835 | Lysholm | Apr. 28, 1942 |
| 2,420,323 | Meyer | May 13, 1947 |
| 2,762,584 | Price | Sept. 11, 1956 |